(12) United States Patent
Levey et al.

(10) Patent No.: US 6,539,990 B1
(45) Date of Patent: Apr. 1, 2003

(54) CAPLESS REFUELING ASSEMBLY

(75) Inventors: Kenneth Levey, West Chicago, IL (US); Eric Parker, Winnetka, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/001,272

(22) Filed: Nov. 20, 2001

(51) Int. Cl.$^7$ ................................................. B65B 1/04
(52) U.S. Cl. ....................... 141/301; 141/350; 220/86.2; 220/DIG. 33
(58) Field of Search .................................. 141/301, 349, 141/350; 220/86.2, DIG. 33; 137/588

(56) References Cited

U.S. PATENT DOCUMENTS

| 5,538,055 A | * | 7/1996 | Kunz et al. |
| 5,730,194 A | * | 3/1998 | Foltz |
| 5,732,840 A | * | 3/1998 | Foltz |
| 6,189,581 B1 | * | 2/2001 | Harris et al. |

* cited by examiner

*Primary Examiner*—Steven O. Douglas
(74) *Attorney, Agent, or Firm*—Mark W. Croll; Paul F. Donovan

(57) ABSTRACT

A closure mechanism is provided for the end of a fuel system filler tube. The closure mechanism has an arm that opens and closes as a refueling nozzle is inserted or removed. The mechanism has channels that direct away any liquids that accumulate near the filler tube end.

31 Claims, 3 Drawing Sheets

CAPLESS REFUELING ASSEMBLY

FIELD OF THE INVENTION

The present invention relates to refueling systems for motor vehicles, and, more specifically, to a capless refueling assembly at the end of a filler tube for a fuel system, which assembly opens and closes automatically upon insertion and removal of a fuel dispensing nozzle.

BACKGROUND OF THE INVENTION

Vehicle fuel supply systems commonly include a fuel tank and a filler tube through which fuel is dispensed into the tank. A removable cap is provided at the end of the filler tube, to close the tube. Heat, movement of the vehicle and the like can cause a build-up of vapor pressure in the fuel tank. Under some conditions, vapor and/or fuel droplets can be discharged from the neck of the filler tube, as the cap is removed from the end of the filler tube. In addition to the unpleasant side affects from being sprayed with fuel and/or vapor, a person can be placed in danger from fire or explosion of the highly volatile substances.

It is known to provide a primary fuel shut-off valve near the end of the filler tube, to vent vapors that accumulate in the tank. The primary fuel shut-off valve also functions to limit back flow of fuel into the outermost area of the filler tube, if the fuel sloshes up the filler tube during operation of the vehicle. A removable fuel cap commonly covers the end of the filler tube, and the cap provides a barrier against dirt or other contaminants from reaching the primary fuel shut-off valve and fouling the operation thereof.

Several problems have been experienced with known designs of refueling systems. Fuel caps can be lost, and the replacement thereof is often forgotten after refueling is complete. To prevent loss of the cap, it is known to attach the fuel cap to the vehicle using a flexible tether strap secured to the housing surrounding the filler tube. To ensure that the tether strap remains in the housing and does not interfere with a door closing the housing, the straps used in the past have been relatively short, and some individuals find the strap to be awkward and interfering as the fuel cap is replaced. Further, the nature of such straps has been such as to require the strap and cap to be held out of the way with one hand while the refueling nozzle is inserted into the filler tube with the other hand.

While a tether strap may prevent loss of the cap, it does not ensure that the cap will be replaced each time refueling is completed. Without replacement of the cap, or with improper replacement of the cap, the closure system is not complete. Dirt and contaminants can enter the filler tube, potentially fouling the primary fuel shut-off valve, and interfering with proper operation and function of the valve. It is also possible for the tether strap to fail, resulting in an unconnected cap, and again raising the potential for the cap to be lost or forgotten during a refueling procedure.

Capless systems have been proposed in the past. Many such systems are complex and costly. Some are confusing and difficult to use, requiring training or instruction in the proper use thereof. Others may not protect adequately the intricate parts of the refueling system from dust or grime that will interfere with proper operation.

Another problem associated with refueling assemblies of vehicle fuel systems involves the accumulation of liquids in the housing surrounding the end of the filler tube. Many embody a cavity or chamber in which the end of the tube and the fuel cap are disposed. Water from rain, melting snow and vehicle washing can accumulate in the chamber. Small amounts of fuel can drip from a fuel-dispensing nozzle during a refueling operation, as the nozzle is removed from the filler tube. The fuel can attract dust and grime, which accumulate over time. During hand washing, it is common for water to be sprayed from a hose or pressure washer into the chamber, in an effort to clean the chamber. The accumulation of water in the chamber, from any source, can enter the filler tube, particularly if the cap is removed therefrom for refueling, or at any time if the cap has been lost or not properly and tightly closed on the end of the filler tube.

The present invention is directed to overcoming one or more of the problems identified above by providing a capless refueling assembly that is simple and intuitive to use, operates in conjunction with common primary fuel shut-off valves, and limits the accumulation of water in the housing chamber surrounding the end of the filler tube.

SUMMARY OF THE INVENTION

The present invention provides a closure mechanism for the end of a fuel system filler tube, which opens and closes as a refueling nozzle is inserted or removed, and which channels away any liquids that may accumulate near the filler tube end.

In one aspect thereof, the invention provides a capless refueling assembly with a filler tube for receiving an input of fuel at a distal end of the tube. A housing defines a chamber surrounding the filler tube end. An end closure mechanism at the tube end yields to pressure from a dispenser nozzle for opening access to the filler tube, allowing insertion of the nozzle into the filler tube. A drain in the chamber directs liquids away from the filler tube.

In another aspect, the invention provides a capless refueling assembly for receiving fuel from a refueling system having a dispenser nozzle. The assembly has a filler tube for receiving an input of fuel. A housing defines a chamber surrounding an end of the filler tube. A drain in the housing conducts accumulated liquid out of the chamber. An arm is attached to the chamber about a pivot, and an enlargement at an end of the arm covers the filler tube end. A stop cooperates with the enlargement to position the enlargement over the filler tube end. A spring biases the enlargement against the stop. Channels extend through the enlargement for channeling liquid away from the filler tube end and into the chamber.

In yet another aspect thereof, the invention provides a filler tube end closure mechanism for a vehicle fuel system having a filler tube with a distal end adapted to receive a dispensing nozzle of a refueling system. The closure mechanism has an arm rotatable about a pivotal connection. An enlargement on the arm covers the filler tube distal end. A fixed stop engages the enlargement to position the enlargement over the filler tube distal end. A biasing means urges the enlargement against the stop. The enlargement is adapted and arranged to yield to insertion of the nozzle, and the arm is adapted to rotate about the pivotal connection in response to insertion and removal of the nozzle relative to the filler tube.

An advantage of the present invention is providing a closure mechanism for the end of a fuel system filler tube for which the proper use is intuitive, which opens readily in response to the start of a refueling procedure, and which closes automatically upon completion of refueling.

Another advantage of the present invention is providing a refueling assembly with structure for draining liquids away from the filler tube end and out of a chamber surrounding the filler tube end, and which is simple in operation and inexpensive to manufacture and install.

Other features and advantages of the invention will become apparent to those skilled in the art upon review of the following detailed description, claims and drawings in which like numerals are used to designate like features.

Figure 1:
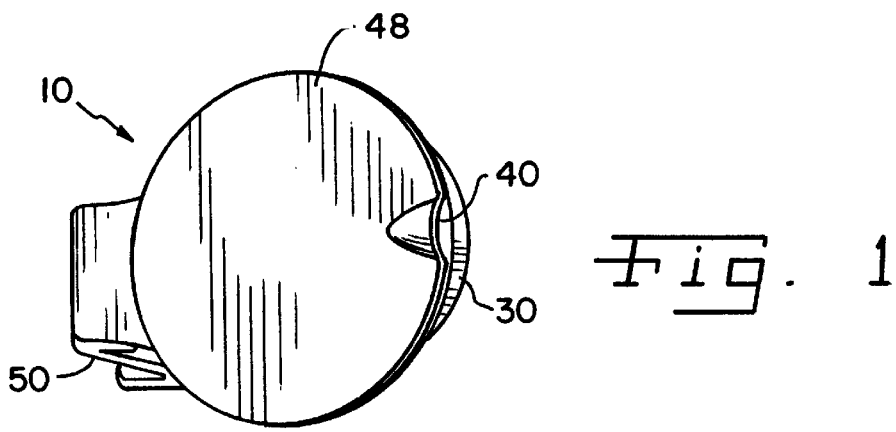
FIG. 1 is a perspective view of a capless refueling assembly in accordance with the present invention, shown in a closed position.

Before the embodiments of the invention are explained in detail, it is to be understood that the invention is not limited in its application to the details of construction and the arrangements of the components set forth in the following description, or illustrated in the drawings. The invention is capable of other embodiments, and of being practiced or being carried out in various ways. Also, it is understood that the phraseology and terminology used herein are for the purpose of description and should not be regarded as limiting. The uses of "including" and "comprising", and variations of each herein are meant to encompass the items listed thereafter, and equivalents thereof, as well as additional items and equivalents thereof.

DETAILED DESCRIPTION OF THE PREFERRED EMBODIMENT

Figure 3:
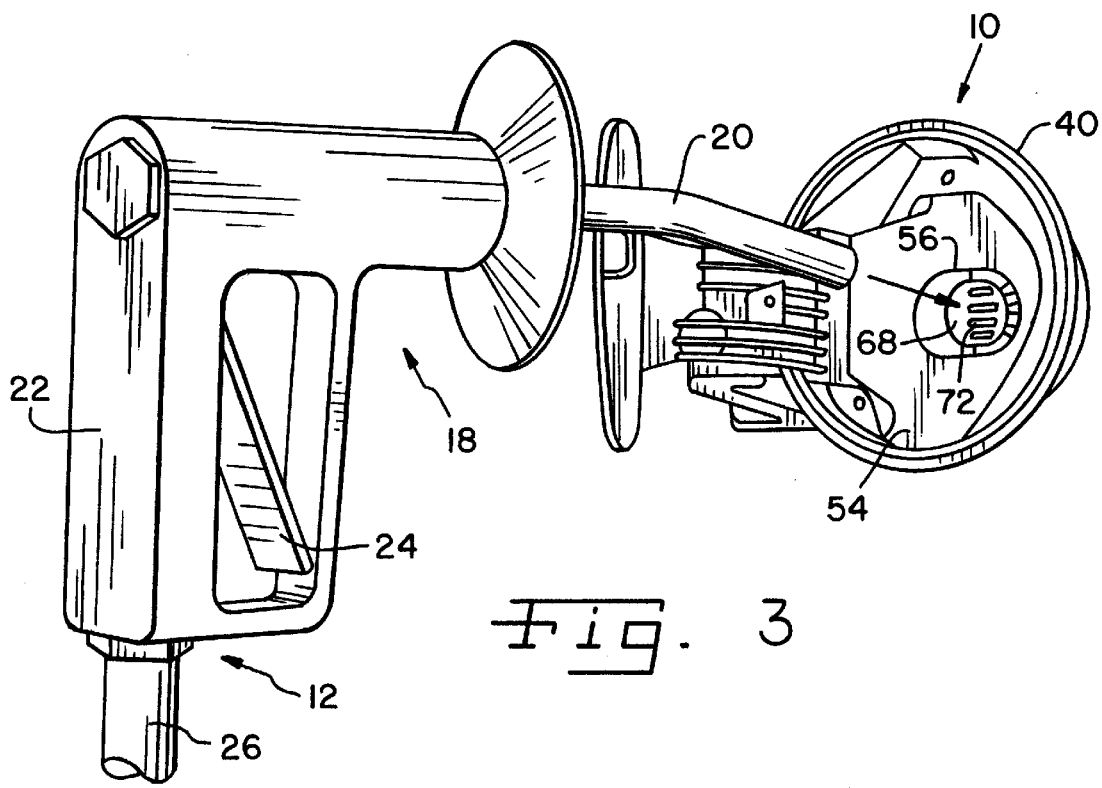
FIG. 3 is a perspective view of the capless refueling assembly, and a refueling nozzle.
Figure 4:
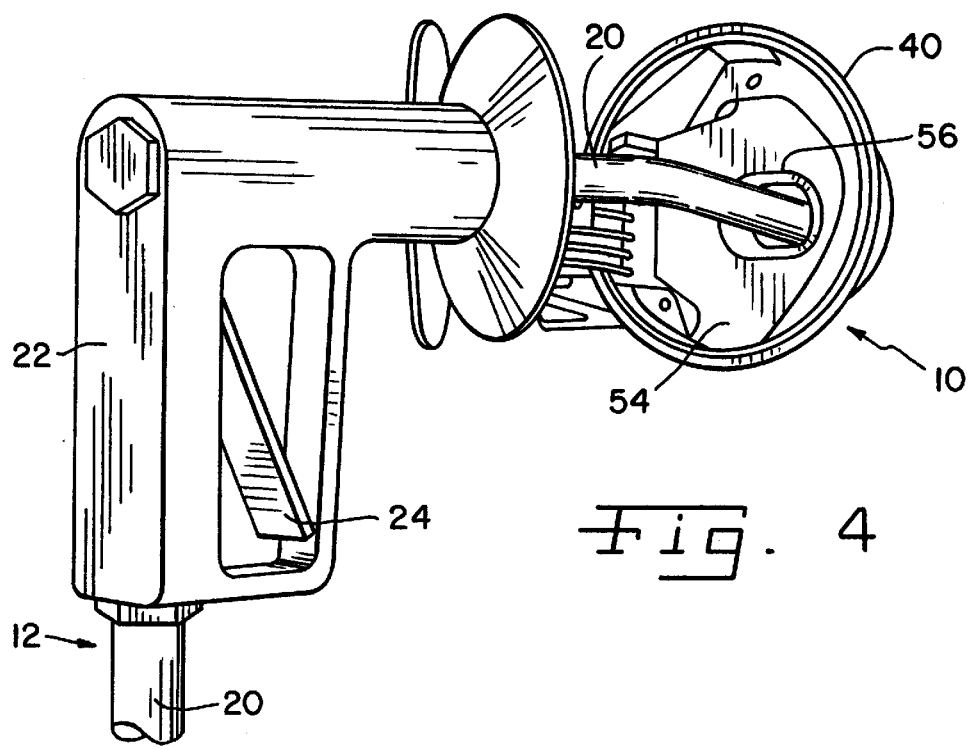
FIG. 4 is a perspective view of the capless refueling assembly and refueling nozzle shown in FIG. 3, but with the nozzle at a position entering the assembly.

Referring now more specifically to the drawings and to FIG. 1 in particular, numeral 10 designates a capless refueling assembly of the present invention. Assembly 10, preferably, is made of plastic, but also may be made of other materials, such as metal. Assembly 10 is particularly advantageous when provided on the fuel system of a motor vehicle, such as a car, truck or the like, and may be adapted for use with gasoline, diesel fuel or other fuels dispensed from a refueling system 12 (FIG. 3). Refueling system 12 may be a conventional gasoline or diesel fuel pump at a refueling station.

Assembly 10 includes a filler tube 14 having a distal end 16 adapted and sized for receiving therein a dispensing nozzle 18 of refueling system 12. Nozzle 18 includes a pipe 20, through which fuel is dispensed from a gun 22 having a flow control trigger 24. Nozzle 18 is connected in fluid flow relationship via a hose 26 to a dispensing pump (not shown). In known manner, fuel is dispensed from nozzle 18 through pipe 20 into filler tube 14, and flows through filler tube 14 to a fuel holding tank (not shown).

A primary fuel shutoff valve 30 is provided in filler tube 14, to vent excess vapor pressure in filler tube 14, to provide a barrier against fuel sloshing in filler tube 14 from the fuel tank (not shown). Primary fuel shutoff valve 30 can be of any acceptable design, known to those skilled in the art, and will not be described in greater detail herein. When primary fuel shutoff valve 30 is provided, distal end 16 of filler tube 14 can be an outer portion, or neck 32 of valve 30.

Assembly 10 of the present invention replaces a common fuel cap used for closing distal end 16 of filler tube 14. Assembly 10 is secured to end 16, and may function independently of primary fuel shutoff valve 30. Therefore, assembly 10 can be used as a replacement for a fuel cap, and can work equally well with various types of primary fuel shutoff valves 30. Alternatively, assembly 10 can include linkages (not shown) connected to primary fuel shutoff valve 30, to relieve pressure, or "burp" the valve as refueling is commenced.

To close distal end 16 of filler tube 14, assembly 10 is provided with a housing 40 defining a chamber 42 in which distal end 16, which may be neck 32 of primary fuel shutoff valve 30, is exposed. Chamber 42 has a bottom 44 that defines a hole 46 in substantial alignment with distal end 16. Housing 40 may be formed as a feature in a part of the vehicle body in which assembly 10 is provided, or maybe separately formed and attached to the vehicle, or directly to filler tube 14 and/or primary fuel shutoff valve 30. Similarly, as those skilled in the art will understand readily, filler tube 14 is fixed in position and secured relative to housing 40, so that end 16 and hole 46 remain in substantial alignment. End 16 may project through hole 46, thereby terminating in chamber 42.

Housing 40 is provided with a door 48, connected relative to housing 40 by a hinge 50. Door 48 can be swung on hinge 50, to alternatively and selectively expose or cover chamber 42. A door spring 52 is connected operatively with hinge 50, in known manner, to bias door 48 toward a closed position, as shown in FIG. 1.

A floor 54 is provided in a lower portion of chamber 42, and defines an opening 56 that, in appearance and position, invites the insertion of pipe 20 therethrough. An end closure mechanism 60 is positioned behind floor 54, between floor 54 and bottom 44.

End closure mechanism 60 includes a closure arm 62 having an end 64 thereof connected to housing 40 via a pivot connection 66, about which end 64 can rotate. An enlargement 68 is provided on closure arm 62, generally opposite pivot connection 66. Enlargement 68 cooperates with a stop 70 formed in bottom 44 to close hole 46. Stop 70 is fixed in position on bottom 44, and is provided in position relative to hole 46 such that enlargement 68 covers hole 46 when enlargement 68 is engaged against stop 70.

Enlargement 68 includes a series of ribs 72 on the surface thereof, ribs 72 angling downwardly from an outer edge 74 of enlargement 68 toward an inner edge 76 thereof, adjacent stop 70. A series of ribs 78 are provided on stop 70, angling downwardly from an outer edge 80 of stop 70 toward an inner edge 82 thereof, adjacent enlargement 68. As associated in chamber 42 of assembly 10, outer edges 74 and 80 of enlargement 68 and stop 70, respectively, are more distant from each other than are inner edges 76 and 82, which are adjacent each other when enlargement 68 is engaged against stop 70. Outer edges 74 and 80 are thicker than inner edges 76 and 82. Ribs 72 and 78 thereby angle downwardly toward each other, and cooperatively form a depression 84 that is exposed through an entrance 86 defined in floor 54.

A biasing means, such as a spring 88, is connected between housing 40 and closure arm 62, in such a way as to urge enlargement 68 toward stop 70. Spring 88 applies sufficient force to arm 62 to ensure that enlargement 68 is engaged against stop 70 under normal operation and use conditions for a vehicle (not shown) in which capless refueling assembly 10 is used.

Figure 7:
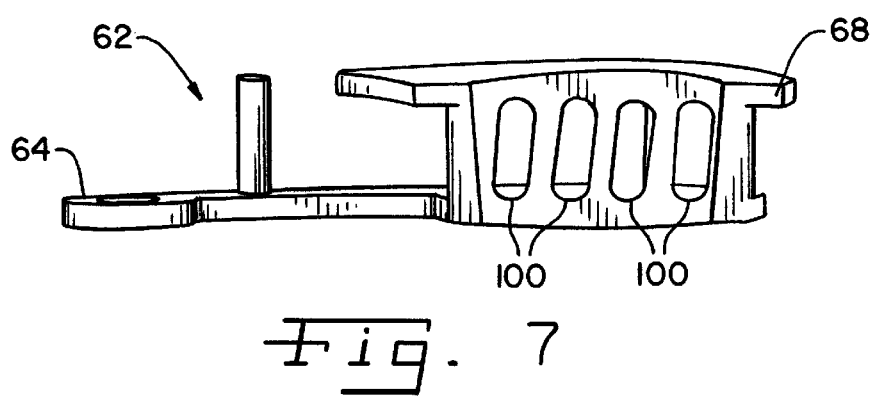
FIG. 7 is a perspective view of the end closure element shown in FIGS. 5 and 6.

Assembly 10 is provided with drain means for removing liquids that accumulate in chamber 42. As can be seen best in FIG. 7, ribs 72 of enlargement 68 are separated by through channels 100 formed in enlargement 68. Channels 100 provide a conduit by which fluid can be drained away from near and around end 16 of filler tube 14. More or fewer channels 100 can be used, and channels 100 also can be provided in stop 70. Channels 100, whether in stop 70 or enlargement 68, provide a path for the removal of liquid from depression 84.

Housing 40 and bottom 44 thereof are shaped and positioned to drain liquids in chamber 42 toward a drain 102 formed in housing 40. Thus, any liquids in housing 40 are drained from housing 40 through drain 102.

Figure 8:
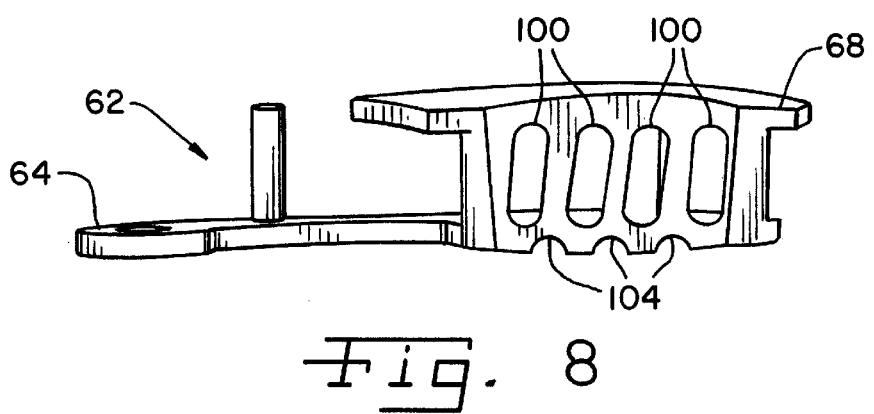
FIG. 8 is a perspective view of a modified embodiment of the end closure element.

A variation of enlargement 68 is shown in FIG. 8. Inner edge 76 thereof has a scallops 104, whereby enlargement 68 can better mesh with stop 70 and ribs 78. Alternatively, scallops 104 can be provided on inner edge 82 of stop 70.

Figure 2:
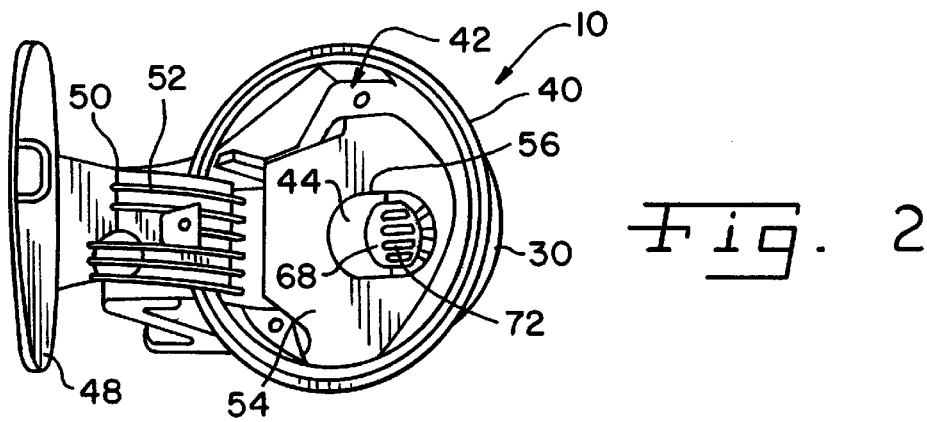
FIG. 2 is a perspective view of the capless refueling assembly, shown in an open position in preparation for refueling.

In the use and operation of capless refueling assembly 10, a refueling procedure is commenced by opening door 48. Door 48 is moved from the closed position shown in FIG. 1 to the open position shown in FIG. 2, whereby chamber 42 is exposed. In opening door 48, spring force from door spring 52 is overcome as door 48 is rotated about hinge 50. Upon completion of the opening of door 48, capless refueling assembly 10 is in the position shown in FIG. 2.

Depression 84 is visible through entrance 86 of the otherwise continuous surface of floor 54. When presented with a view similar to that shown in FIG. 2, a person performing the refueling operation instinctively knows to push pipe 20 against ribs 72 and 78 of enlargement 68 and stop 70, respectively. The otherwise continuous surface of floor 54 presents no other options for the insertion of pipe 20 from nozzle 18. Therefore, use of capless refueling assembly 10 is instinctive and intuitive, requiring no individual training or instruction.

Figure 6:
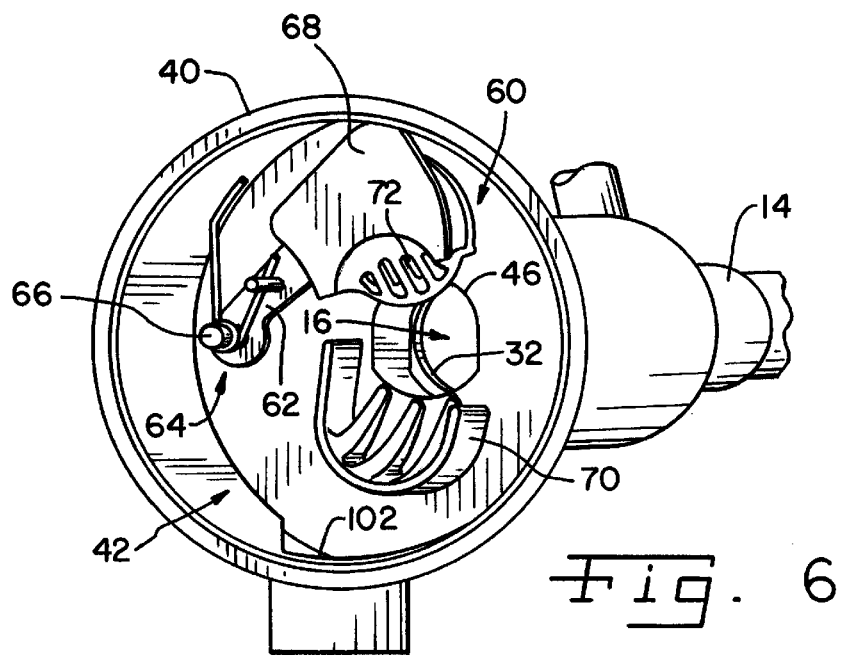
FIG. 6 is a perspective view of the capless refueling assembly shown in FIG. 5, but with the end closure element thereof in an open position.

As pipe 20 is forced against downwardly sloping ribs 72 and 78, enlargement 68 is forced away from stop 70, as arm 62 is rotated about pivotal connection 66. The end of pipe 20 is directed downwardly toward distal end 16 of filler pipe 20, and continued exertion of force pushes enlargement 68 fully toward the open position illustrated in FIG. 6. The shapes and positions of ribs 72 and 78 are such as to properly align pipe 20 of nozzle 18 with distal end 16 of filler tube 14. After pipe 20 is properly inserted in end 16, refueling continues according to normal practices, with trigger 24 being depressed to enable a flow of fuel through hose 26 and pipe 20. Fuel is thereby deposited into the fuel tank (not shown) through filler tube 14.

Figure 5:
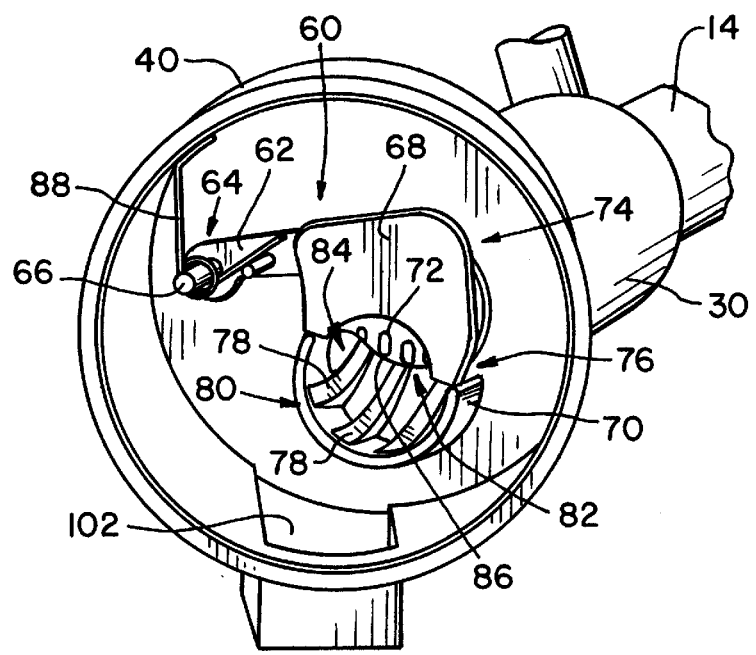
FIG. 5 is a perspective view of the capless refueling assembly, with a cover and floor thereof removed.

Upon completion of the refueling procedure, trigger 24 is released to terminate the flow of fuel into filler tube 14, and pipe 20 is withdrawn from filler tube 14. Spring 88 immediately urges enlargement 68 toward the closed position as shown in FIG. 5, wherein enlargement 68 abuts against stop 70. Distal end 16 of filler tube 14 is thereby effectively closed and sealed against the ingress of dirt, contaminants and fluids such as water.

Fuel spillage, or the accumulation of water, sleet, snow or rain in chamber 42, can be handled effectively with capless refueling assembly 10 according to the present invention. Any liquid accumulating in chamber 42 is quickly discharged via drain 102. Channels 100 direct any liquids in the immediate area of filler tube end 16 toward the more open regions of chamber 42, which is shaped and positioned to direct all liquid to flow toward drain 102. Thus, accidental accumulations are evacuated, as are intentional accumulations from water spray during washing activities. Further, ribs 72 with channels 100 therebetween divert even high pressure spray such as from washing apparatus, and the potential for accidental moving of enlargement 68 by high pressure spray is reduced.

As can be seen from the above description, both opening and closing of distal end 16 are automatic. Primary fuel shutoff valve 30 is protected against contamination and fouling at all times. Covering or closing distal end 16 can not be forgotten, since it is automatic. Refueling procedures are simplified in that cumbersome tethered filler tube caps are eliminated. Advantageously, disconnected parts are eliminated, avoiding the potential for loss or misplacement of a filler tube cap. Liquids accidentally or intentionally deposited in chamber 42 are channeled away from end 16 and out of chamber 42.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A capless refueling assembly for receiving fuel from a refueling system having a dispensing nozzle, said assembly comprising:

a filler tube for receiving an input of fuel from the dispensing nozzle, said filler tube having an end adapted to receive the dispensing nozzle therein;

a housing defining a chamber surrounding said filler tube end;

an end closure mechanism at said tube end, said end closure mechanism adapted to cover said filler tube end and to yield to pressure from the dispensing nozzle being inserted to pivot away from said filler tube, for opening access to said filler tube; and drain means in said chamber for directing liquids away from said filler tube end.

2. The capless refueling assembly of claim 1, said chamber defining a hole aligned with said filler tube end.

3. The capless refueling assembly of claim 1, said end closure mechanism including an arm attached to said chamber about a pivot, and an enlargement at an end of said arm for covering said filler tube end.

4. The capless refueling assembly of claim 3, said housing including a stop cooperating with said enlargement to position said enlargement over said filler tube end.

5. The capless refueling system of claim 4, said enlargement and said stop shaped to cooperate in directing the nozzle into said filler tube, while pivoting said arm about said pivot.

6. The capless refueling assembly of claim 5, including a spring biasing said enlargement against said stop.

7. The capless refueling assembly of claim 6, including a door on said housing for covering said chamber, and a hinge connecting said door to said housing.

8. The capless refueling assembly of claim 7, including a door spring biasing said door to a closed position.

9. The capless refueling assembly of claim 8, said drain means including channels through said enlargement for directing liquids away from said filler tube end.

10. The capless refueling assembly of claim 3, said drain means including channels through said enlargement for directing liquids away from said filler tube end, and a drain in said housing.

11. The capless refueling assembly of claim 1, including a primary fuel shutoff valve in said filler tube, and a neck of said valve defining said filler tube end.

12. The capless refueling assembly of claim 11, said end closure element including an arm attached to said chamber about a pivot, and an enlargement at an end of said arm covering said filler tube end.

13. The capless refueling assembly of claim 12, said housing including a stop cooperating with said enlargement to position said enlargement over said filler tube end.

14. The capless refueling system of claim 13, said drain means including channels through said enlargement for directing liquids away from said filler tube end, and a drain in said housing.

15. A capless refueling assembly for receiving fuel from a refueling system having a dispensing nozzle including a dispensing end, said assembly comprising:

a filler tube for receiving an input of fuel, said filler tube having an end adapted to receive the dispensing nozzle therein;

a housing defining a chamber surrounding said filler tube end;

a drain in said housing for conducting accumulated liquid out of said chamber;

an arm attached to said chamber about a pivot, and an enlargement at an end of said arm for covering said filler tube end;

a stop in said chamber cooperating with said enlargement to position said enlargement over said filler tube end;

a biasing means urging said enlargement against said stop; and channels extending through said enlargement for channeling liquid away from said filler tube end and into said chamber.

16. The capless refueling assembly of claim 15, said enlargement including ribs angling downwardly toward said stop, and said stop including ribs angling downwardly toward said enlargement, said ribs on said enlargement and said ribs on said stop cooperatively forming a depression for engaging the dispensing end of the nozzle.

17. The capless refueling assembly of claim 15, said housing including a hinged door for covering said chamber.

18. The capless refueling assembly of claim 15, said housing having a bottom, and including a floor disposed in said chamber, and said arm disposed between said floor and said bottom.

19. The capless refueling assembly of claim 15, including a primary fuel shutoff valve in said filler tube.

20. A filler tube end closure mechanism for a vehicle fuel system having a filler tube with a distal end adapted to receive a dispensing nozzle of a refueling system, said end closure mechanism comprising:

an arm rotatable about a pivotal connection, and including an enlargement on said arm for covering said filler tube distal end;

a fixed stop for engaging said enlargement in a position over said filler tube distal end;

a biasing means urging said enlargement against said stop;

said enlargement adapted and arranged to yield to insertion of the nozzle, and said arm adapted to rotate about said pivotal connection in response to insertion and removal of the nozzle relative to the filler tube; and said enlargement and said stop each being thicker at distant edges thereof and thinner at edges nearer each other, to define a depression therebetween for receiving an end of the dispensing nozzle.

21. The closure mechanism of claim 20, each said enlargement and said stop having ribs thereon, and said ribs on each angling downwardly toward said ribs on the other.

22. The closure mechanism of claim 21, one of said enlargement and said stop having a scalloped edge for engaging the ribs on the other of said enlargement and said stop.

23. The closure mechanism of claim 21, including channels in at least one of said enlargement and said stop for directing liquids away from said filler tube distal end.

24. The closure mechanism of claim 23, said channels disposed between said ribs of said enlargement.

25. The closure mechanism of claim 20, said biasing means including a spring.

26. The closure mechanism of claim 20, including channels in at least one of said enlargement and said stop for directing liquids away from said filler tube distal end.

27. A capless refilling assembly for receiving fuel from a refueling system having a dispensing nozzle, the assembly comprising:

a filler tube for receiving an input of fuel from the dispensing nozzle, the filler tube having an open end adapted to receive the dispensing nozzle therein; and an end closure member positioned over the open end of the filler tube, the end closure member being movable away from the open end of the filler tube in a direction which is substantially normal to the filler tube when the dispensing nozzle is caused to engage the end closure member upon insertion into the open end of the filler tube.

28. The capless refueling assembly of claim 27, wherein the end closure member is biased in a direction to close the open end of the filler tube, and wherein the end closure member is adapted and arranged to rotate about a pivotal connection in response to the insertion and removal of the dispensing nozzle relative to the filler tube.

29. The capless refueling assembly of claim 27, wherein the end closure member includes a depression for receiving an end of the dispensing nozzle.

30. The capless refueling assembly of claim 27, wherein the end closure member is adapted and configured to direct liquids away from the open end of the filler tube when the end closure member is positioned over the open end of the filler tube.

31. The capless refueling assembly of claim 27, further comprising a housing defining a chamber surrounding the open end of the filler tube, the chamber having a drain for directing liquids out of the chamber to inhibit such liquids from undesirably entering the open end of the filler tube.

* * * * *